US011562743B2

(12) United States Patent
Shir

(10) Patent No.: US 11,562,743 B2
(45) Date of Patent: Jan. 24, 2023

(54) ANALYSIS OF AN AUTOMATICALLY GENERATED TRANSCRIPTION

(71) Applicant: salesforce.com, inc., San Francisco, CA (US)

(72) Inventor: Maayan Shir, Tel-Aviv (IL)

(73) Assignee: salesforce.com, inc., San Francisco, CA (US)

( * ) Notice: Subject to any disclaimer, the term of this patent is extended or adjusted under 35 U.S.C. 154(b) by 339 days.

(21) Appl. No.: 16/775,295

(22) Filed: Jan. 29, 2020

(65) Prior Publication Data
US 2021/0233535 A1 Jul. 29, 2021

(51) Int. Cl.
*G10L 15/26* (2006.01)
*G10L 15/065* (2013.01)
*G10L 15/22* (2006.01)

(52) U.S. Cl.
CPC ............ *G10L 15/26* (2013.01); *G10L 15/065* (2013.01); *G10L 15/22* (2013.01); *G10L 2015/223* (2013.01)

(58) Field of Classification Search
CPC ................................ G10L 15/26; G06F 40/194
See application file for complete search history.

(56) References Cited

U.S. PATENT DOCUMENTS

| | | | | |
|---|---|---|---|---|
| 8,825,489 B2* | 9/2014 | Scoggins, II | .... | H04N 21/47205 704/235 |
| 10,607,599 B1* | 3/2020 | Shelef | ................... | H04R 3/005 |
| 10,607,611 B1* | 3/2020 | Shellef | ................... | G10L 15/01 |
| 10,614,265 B2* | 4/2020 | Fume | ...................... | G06F 3/167 |
| 10,614,810 B1* | 4/2020 | Shellef | ................... | G10L 15/26 |
| 10,726,834 B1* | 7/2020 | Shellef | ................... | G10L 15/08 |
| 11,011,157 B2* | 5/2021 | Dernoncourf | ........... | G10L 15/26 |
| 11,093,710 B2* | 8/2021 | Cherepanov | .......... | G06F 40/232 |
| 11,138,970 B1* | 10/2021 | Han | ................... | H04L 63/0414 |

(Continued)

OTHER PUBLICATIONS

Haubold, Alexander, and John R. Kender. "Alignment of speech to highly imperfect text transcriptions." 2007 IEEE International Conference on Multimedia and Expo. IEEE, 2007.*

(Continued)

*Primary Examiner* — Jesse S Pullias

(57) ABSTRACT

There is provided a computer implemented method of aligning an automatically generated transcription of an audio recording to a manually generated transcription of the audio recording comprising: identifying non-aligned text fragments, each located between respective two non-continuous aligned text-fragments of the automatically generated transcription, each aligned text-fragment matching words of the manually generated transcription, for each respective non-aligned text fragment: mapping a target keyword of the manually generated transcription to phonemes, mapping the respective non-aligned text fragment to a corresponding audio-fragment of the audio recording, mapping the audio-fragment to phonemes, identifying at least some of the phonemes of the audio-fragment that correspond to the phonemes of the target keyword, and mapping the identified at least some of the phonemes of the audio-fragment to a (Continued)

corresponding word of the automatically generated transcript, wherein the corresponding word is an incorrect automated transcription of the target word appearing in the manually generated transcription.

16 Claims, 11 Drawing Sheets

(56) References Cited

U.S. PATENT DOCUMENTS

| | | | |
|---|---|---|---|
| 2013/0120654 A1* | 5/2013 | Kuspa | G11B 27/28 348/E9.034 |
| 2013/0124213 A1* | 5/2013 | Scoggins, II | H04N 21/8547 704/E11.001 |
| 2016/0275942 A1* | 9/2016 | Drewes | G06F 40/242 |
| 2017/0133007 A1* | 5/2017 | Drewes | G10L 15/22 |
| 2021/0043196 A1* | 2/2021 | Lee | G10L 15/32 |
| 2021/0142789 A1* | 5/2021 | Gurbani | G10L 15/183 |

OTHER PUBLICATIONS

A. Moldovan, A. Stan and M. Giurgiu, "Improving sentence-level alignment of speech with imperfect transcripts using utterance concatenation and VAD," 2016 IEEE 12th International Conference on Intelligent Computer Communication and Processing (ICCP), 2016, pp. 171-174, doi: 10.1109/ICCP.2016.7737141.*

Hazen, Timothy J. "Automatic alignment and error correction of human generated transcripts for long speech recordings." Ninth International Conference on Spoken Language Processing. 2006.*

Park, Alex, Timothy J. Hazen, and James R. Glass. "Automatic processing of audio lectures for information retrieval: Vocabulary selection and language modeling." Proceedings.(ICASSP'05). IEEE International Conference on Acoustics, Speech, and Signal Processing, 2005 . . . vol. 1. IEEE, 2005.*

Hixon et al. "Phonemic Similarity Metrics to Compare Pronunciation Methods", 12th Annual Conference of the International Speech Communication Association, INTERSPEECH 2011, Florence, Italy, Aug. 28-31, 2011, p. 825-828, Aug. 28, 2011.

Pucher et al. "Phonetic Distance Measures for Speech Recognition Vocabulary and Grammar Optimization", 3rd Congress of the Alps Adria Acoustics Association, 4 P., Sep. 27, 2007.

Qin "Learning Out-of-Vocabulary Words in Automatic Speech Recognition", Thesis Submitted in Partial Fulfillment of the Requirements for the Degree of Doctor of Philosophy in Language and Information Technologies, Language Technologies Institute, School of Computer Science, Carnegie Mellon University, Pittsburgh, PA, USA, p. 1-97, 2013.

* cited by examiner

FIG. 8

| Golden 902 | ASR 904 | |
|---|---|---|
| *cause my my sister um was using* | *cause my my sister um was using* | *aligned* |
| *uh fannie mae and she had uh issue with her* | *fannie nay and she had a issue with her um* | |
| *insurance are like she she* | *insurance are like she she* | *aligned* |

| Golden 902 | ASR 904 | |
|---|---|---|
| *cause my my sister um was using* | *cause my my sister um was using* | |
| *uh fannie mae and she had uh issue with her* | *fannie nay and she had a issue with her um* | |
| *insurance are like she she* | *insurance are like she she* | |

906 →
908 →
910 →
912 (→ fannie mae)

ANALYSIS OF AN AUTOMATICALLY GENERATED TRANSCRIPTION

BACKGROUND

Some embodiments relate to automatically generated transcription of an audio recording and, more specifically, but not exclusively, to systems and methods for analysis of the automatically generated transcription.

Transcription of an audio recording into text is traditionally performed by a human transcriber listening to a portion of the audio recording, pausing the recording, typing what was said in the portion, and then proceeding to the next portion. Although manual human transcription of audio is a time consuming and tedious manual task, such transcription is considered the gold standard. Automated processes for transcription of audio recordings are being introduced, but such automated processes suffer from errors in transcription, for example, selecting a similar sounding transcription word to the word that was actually said in the audio recording, which is an incorrect transcription. Such errors require human intervention to spot and fix.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 8 is a schematic of an exemplary table used to compute weighted phoneme distances, in accordance with some embodiments;

DETAILED DESCRIPTION

Figure 1:
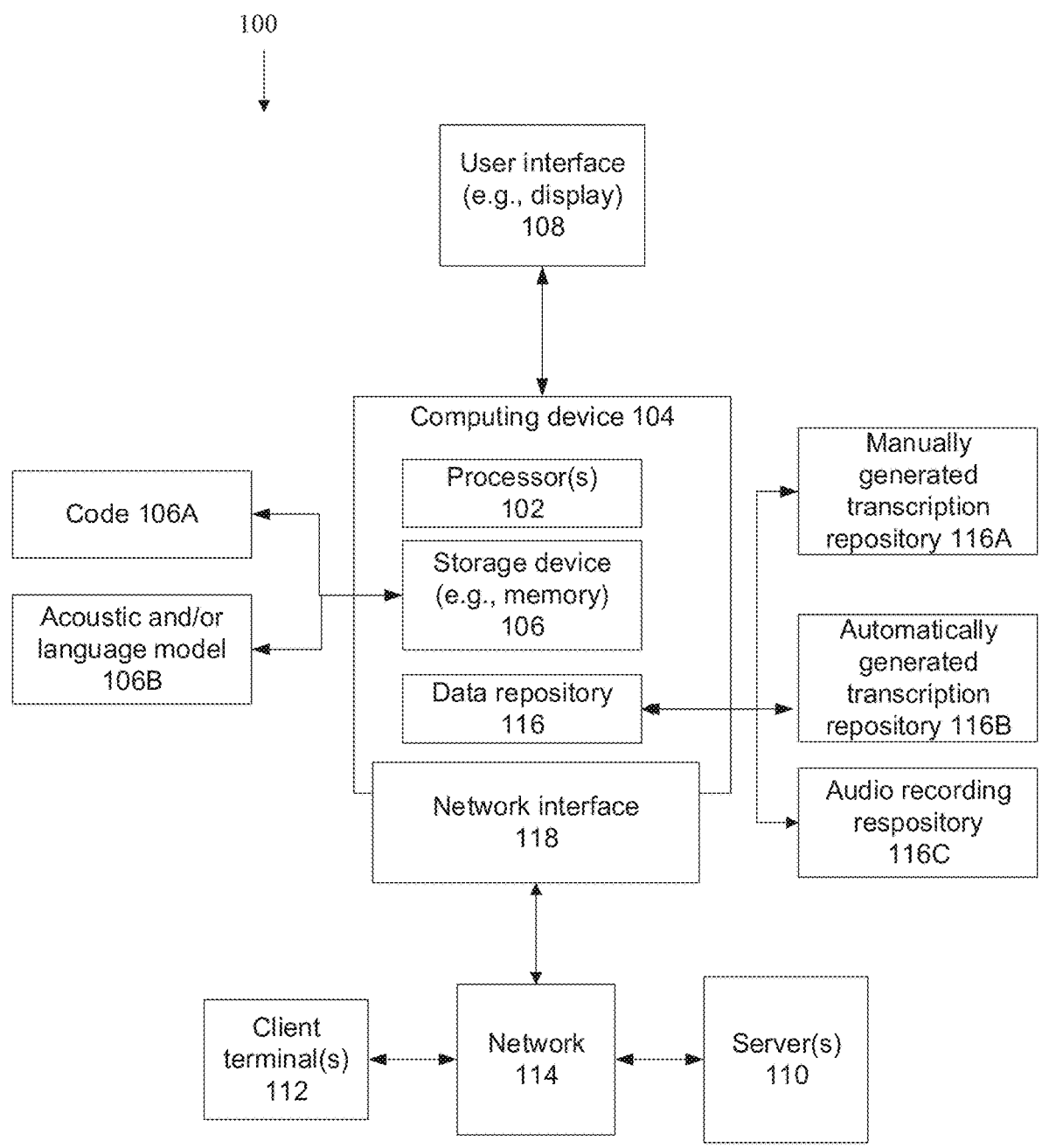
FIG. 1 is a block diagram of a system for analyzing an automatically generated transcription of an audio recording, in accordance with some embodiments.

According to a first aspect, a computer implemented method of aligning an automatically generated transcription of an audio recording to a manually generated transcription of the audio recording comprises: identifying a plurality of non-aligned text fragments, each located between respective two non-continuous aligned text-fragments of the automatically generated transcription, each aligned text-fragment matching a plurality of words of the manually generated transcription, for each respective non-aligned text fragment: mapping a target keyword of the manually generated transcription to a plurality of phonemes, mapping the respective non-aligned text fragment to a corresponding audio-fragment of the audio recording, mapping the audio-fragment to a plurality of phonemes, identifying at least some of the plurality of phonemes of the audio-fragment that correspond to the plurality of phonemes of the target keyword, and mapping the identified at least some of the plurality of phonemes of the audio-fragment to a corresponding word of the automatically generated transcript, wherein the corresponding word is an incorrect automated transcription of the target word appearing in the manually generated transcription.

In a further implementation form of the first aspect, the at least some of the plurality of phonemes of the audio-fragment are identified as corresponding to the plurality of phonemes of the target keyword according to a closest matched computed based on shortest phoneme weighted distance.

In a further implementation form of the first aspect, words of the automatically generated transcription are associated with a timestamp indicating a mapping to the audio recording, and wherein the respective non-aligned text fragment is mapped to the corresponding audio-fragment according to the timestamp.

In a further implementation form of the first aspect, the matching comprises selecting the at least some of the plurality of phonemes of the audio-fragment, according a lowest value of a phoneme distance to the plurality of phonemes of the keyword of the manually generated transcript.

In a further implementation form of the first aspect, the phoneme distance is selected from the group: a binary phoneme distance that assigns a binary value indicative of whether each respective phenome is matched or is not matched, and a weighted phoneme distance that assigns a non-binary value indicative of an amount of similarity between corresponding phonemes.

In a further implementation form of the first aspect, further comprising feeding the target keyword of the manually generated transcription and the corresponding word of the automatically generated transcription for automatically updating a model that computes the automatically generated transcript.

In a further implementation form of the first aspect, the target keyword of the manually generated transcription and the corresponding word of the automatically generated transcription are used for adjusting the model for correctly automatically transcribing an audio-fragment corresponding to the audio-fragment of the audio recording to the target keyword of the manually generated transcription instead of to the corresponding word of the automatically generated transcript.

In a further implementation form of the first aspect, further comprising computing a value for precision and/or recall of transcription of the target keyword of the manually generated transcription in the automatically generated transcript.

In a further implementation form of the first aspect, the automatically generated transcription is created by an acoustic model that extracts phonemes from the audio recording and assigns a probability value to each phoneme denoting likelihood of accurate extraction, and a language model that receives the extracted phonemes and outputs the automatically generated transcription by mapping phonemes to words and determines a word sequence probability.

In a further implementation form of the first aspect, each of the plurality of aligned text-fragments includes a sequence of at least 4 matching words.

According to a second aspect, a computer implemented method of evaluating quality of an automatically generated transcription of an audio recording, comprises: receiving an audio recording, computing the automatically generated transcription of the audio recording by an acoustic model that extracts phonemes from the audio recording and a language model that receives the extracted phonemes and outputs the automatically generated transcription by mapping phonemes to words selected from a lexicon, wherein each respective word is assigned a respective confidence value, for each respective word selected from the lexicon, computing a phoneme distance between phonemes extracted from a portion of the acoustic recording corresponding to the respective selected word and phonemes of the respective selected word, and generating an indication of likelihood of an error of the respective selected word when the computed phoneme distance is above a threshold, the error indicative of at least one of: no correct word corresponding to the phonemes extracted from the portion of the acoustic recording exists in the lexicon, and an error in the automated transcription of the phonemes extracted from the portion of the acoustic recording.

In a further implementation form of the second aspect, further comprising receiving a correction of the respective selected word, and updating the lexicon and the model with the correction.

In a further implementation form of the second aspect, the respective confidence value of the respective word selected from the lexicon indicative of likelihood of error denotes the most likely match within the lexicon.

According to a third aspect, a computer implemented method of post-processing an automatically generated transcription of an audio recording to correct transcription errors, comprises: receiving an audio recording, computing the automatically generated transcription of the audio recording by an acoustic model that extracts phonemes from the audio recording, and a language model that receives the extracted phonemes and outputs the automatically generated transcription by mapping phonemes to words selected from a lexicon, receiving a plurality of target words, computing a respective weighted phoneme distance that assigns a non-binary value indicative of an amount of similarity between corresponding phonemes, from an automatically transcribed word of the automatically generated transcription to each of the plurality of target words, and when the respective phoneme distance is according to a requirement, switching the respective automatically transcribed word to a certain target word of the plurality of target words corresponding to a lowest value of the respective phoneme distance.

In a further implementation form of the third aspect, the plurality of target words are excluded from the lexicon.

In a further implementation form of the third aspect, the requirement denotes that the automatically transcribed word is similar to but not identical to the plurality of target words.

In a further implementation form of the third aspect, the requirement is a range having an upper threshold value of the phoneme distance denoting identical words and a lower threshold value of the phoneme distance denoting similar but difference words.

In a further implementation form of the third aspect, the respective automatically transcribed word and an indication of a switch to the certain target word are used to update the language model for improved accuracy in mapping phonemes to the certain target word.

In a further implementation form of the third aspect, the automatically transcribed word is selected for inclusion in the automatically generated transcription when the automatically transcribed word is assigned a confidence value by the language model above a threshold.

In a further implementation form of the third aspect, further comprising confirming the switching when a phoneme distance computed between phonemes extracted from a portion of the audio recording corresponding to the automatically transcribed word and the certain target word denotes statistical equivalence.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to automatically generated transcription of an audio recording and, more specifically, but not exclusively, to systems and methods for analysis of the automatically generated transcription.

An aspect of some embodiments relates to systems, methods, an apparatus, and/or code instructions (stored on a memory and/or computer program product, executable by one or more hardware processors) for aligning an automatically generated transcription of an audio recording to a manually generated transcription of the audio recording. Non-aligned text fragments are identified. Each non-aligned text fragment is located between two non-continuous aligned text-fragments of the automatically generated transcription. Each aligned text-fragment matches words of the manually generated transcription. Each respective non-aligned text fragment is processed as follows: A target keyword of the manually generated transcription is mapped to phonemes. The respective non-alignment text fragment is mapped to a corresponding audio-fragment of the audio recording. The audio-fragment is mapped to phonemes which are generated for example using an acoustic model. A sub-set of the phonemes of the audio-fragment that correspond to the phonemes of the target keyword are identified. The identified sub-set of the phonemes of the audio-fragment are mapped to a corresponding word of the automatically generated transcript using corresponding timestamps associated with the automatically generated transcription. The corresponding word is an incorrect automated transcription of the target word appearing in the manually generated transcription, which may be automatically corrected and/or used to automatically retrain an acoustic and/or language model.

An aspect of some embodiments relates to systems, methods, an apparatus, and/or code instructions (stored on a memory and/or computer program product, executable by one or more hardware processors) for evaluating quality of an automatically generated transcription of an audio recording. The automatically generated transcription of the audio recording is computed by an acoustic model that extracts phonemes and corresponding probabilities indicating estimated accuracy of extraction of the respective phoneme from the audio recording and a language model that receives the extracted phonemes and corresponding probabilities and outputs strings of words and corresponding probabilities, creating the most likely automatically generated transcription by mapping phonemes to one or more words selected from a lexicon, for example, individual words or phrases of multiple words, or whole sentences. Each respective word is assigned a respective confidence value. For each respective word selected from the lexicon, a phoneme distance is computed between phonemes extracted from a portion of the acoustic recording corresponding to the respective selected word and phonemes of the respective selected word, as the words are listed in the lexicon that is used. An indication of likelihood of an error of the respective selected word is generated when the computed phoneme distance is above a threshold. The error may indicate that no correct word corresponding to the phonemes extracted from the portion of the acoustic recording exists in the lexicon, and/or an error in the automated detection in the acoustic model of the phonemes extracted from the portion of the acoustic recording. The error may be corrected, optionally automatically.

It is noted that using the computed phoneme distance provides an evaluation of quality of the automatically generated transcription, in contrast to the standard approach of using confidence of the transcribed word which is selected from the lexicon, which does not evaluate quality since standard approach does not provide an indication of whether the actual selected word is proper or not, i.e., when the actual word that should be selected is not currently in the lexicon.

An aspect of some embodiments relates to systems, methods, an apparatus, and/or code instructions (stored on a memory and/or computer program product, executable by one or more hardware processors) for post-processing an automatically generated transcription of an audio recording to correct transcription errors. The automatically generated transcription of the audio recording may be computed by an acoustic model that extracts phonemes from the audio recording, and/or a language model that receives the extracted phonemes and outputs the automatically generated transcription by mapping phonemes to words selected from a lexicon. Target words, optionally excluded from the lexicon, are received. A respective phoneme distance from an automatically transcribed word of the automatically generated transcription to each of the target words is computed. Optionally, a weighted phoneme distance that assigns a non-binary value indicative of an amount of similarity between corresponding phonemes, is computed. When the respective phoneme distance is according to a requirement (e.g., threshold), the respective automatically transcribed word may be switched (e.g. automatically) to a certain target word, for example, the target word corresponding to a lowest value of the respective phoneme distance. The requirement may indicate that the automatically transcribed word is similar to but not identical to the target words.

At least some implementations of the systems, methods, apparatus, and/or code instructions described herein address the technical problem of aligning a manually generated transcript of the audio recording (i.e., created manually by human data transcribers) representing a perfect baseline transcription (i.e., gold standard) with the automatically generated transcription. The alignment may be performed for target keywords, for example, keywords that are not in the lexicon at the time of automated generation of the transcription, and/or keywords that are difficult to accurately transcribe on a consistent basis. The alignment may be performed for any keyword, optionally all keywords in the corpus, which consumes significant computational resources (e.g., processor utilization, processing time). At least some implementations of the systems, methods, apparatus, and/or code instructions described herein compute the alignment for keywords of interest, as described herein, which improves the computer performing the alignment by reducing the amount of computational resources required in comparison to performing alignment for other keywords, such as all keywords.

At least some implementations of the systems, methods, apparatus, and/or code instructions described herein improve the technical field of automatically generated transcriptions, i.e., by a model, by automatically aligning target keywords in a manual transcription with automatically transcribed words in the automatically generated transcription. The alignment may be used, for example, to find errors in the automatic transcription, computing precision and/or recall and/or other measures of accuracy of the automated transcription of the target word, and/or providing data for updating and/or correcting the model that generates the automated transcription to improve accuracy of transcribing the target work rather than the incorrect transcribed word. The alignment of matching sequences of words (e.g., at least 3, 4, 5 or greater number of sequential words) identifies non-aligned text fragments that are aligned by proxy. For each pair of non-aligned text fragments, a counterpart to the phoneme breakdown of the keyword which is found in the gold standard transcription (i.e., the manually generated transcription) is searched for in the corresponding detected non-aligned text fragment's phonemes of the automatically generated transcription. The best match found in the corresponding non-aligned text fragment is assumed to be correct. The alignment process improves performance of a computing device performing the matching to the key word, since searching outside of the corresponding non-aligned text fragment is not needed.

At least some implementations of the systems, methods, apparatus, and/or code instructions described herein address the technical problem of evaluating quality and/or accuracy of the automatically generated transcription. Using standard approaches, models that automatically generate transcriptions select the most appropriate word for a portion of the audio recording based on a confidence value of the selected word. The word having the highest confidence value is selected. The standard approaches do not evaluate the quality of the transcription because confidence value is not indicative of quality. For example, a confidence value of 1 may indicate high quality, but confidence values between 0.01 and 0.99 are arbitrary measures for transcription quality. The selected word, even while having the highest confidence value, may be incorrect. For example, the actual word that should be transcribed is not in the lexicon used for the automatically generated transcription. In another example, the actual word cannot be heard properly, for example, due to loud background noise and/or a pronunciation for which the model has not been trained. As a result, the closest sounding but not identical word from the lexicon is selected as the best match, and inserted into the transcription. The error may not be apparent, since the confidence value of the selected word is high. The error may only be spotted by a human reader reviewing the automated transcription.

At least some implementations of the systems, methods, apparatus, and/or code instructions described herein improve the technical field of automatically generated transcriptions, i.e., by a model, by evaluating the quality of the transcribed word selected from the lexicon as the best match. A phoneme distance is computed between phonemes of the selected word and phonemes extracted from the corresponding audio portion. When the phoneme distance is above a threshold indicating that the selected word does not sound like the audio word, an error is likely detected. It is noted that the phoneme distance may be above the threshold even when the selected transcribed word is the closest word in the lexicon to the audio word. Extreme values of the computed phoneme distance may indicate that the audio word is not represented in the lexicon, and/or that the transcribed word is not an accurate match to the audio word (e.g., where the audio word actually has a counterpart in the lexicon, but the audio word is distorted due to background noise or strange pronunciation).

At least some implementations of the systems, methods, apparatus, and/or code instructions described herein address the technical problem of automatically switching incorrectly transcribed words to a correct target word, for example, when the target word was not in the lexicon at the time when the automatic transcription was generated.

At least some implementations of the systems, methods, apparatus, and/or code instructions described herein improve the technical field of automatically generated transcriptions, i.e., by a model, by identifying transcribed words that have a phoneme distance to a target word according to a requirement, and switching the identified transcribed words to the target word. The phoneme distance indicates when the identified transcribed words should be switched to the target word.

Before explaining at least one embodiment in detail, it is to be understood that the embodiments are not necessarily limited in their application to the details of construction and the arrangement of the components and/or methods set forth in the following description and/or illustrated in the drawings and/or the Examples. The embodiments are capable of other embodiments or of being practiced or carried out in various ways.

The embodiments may be a system, a method, and/or a computer program product. The computer program product may include a computer readable storage medium (or media) having computer readable program instructions thereon for causing a processor to carry out the aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
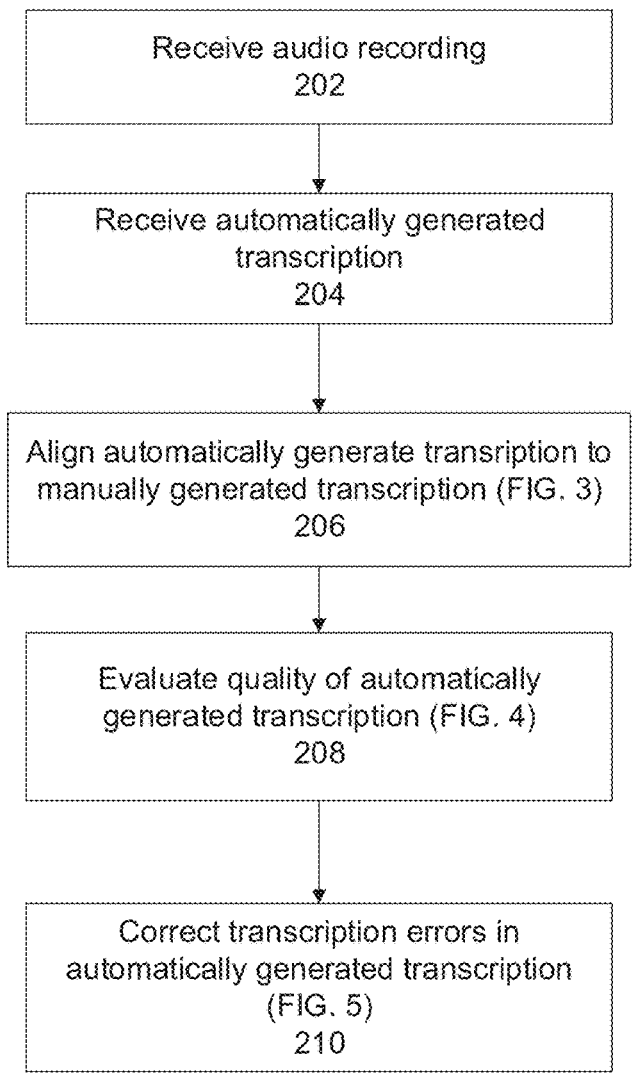
FIG. 2 is a flowchart of a method for analyzing an automatically generated transcription of an audio recording, in accordance with some embodiments.
Figure 3:
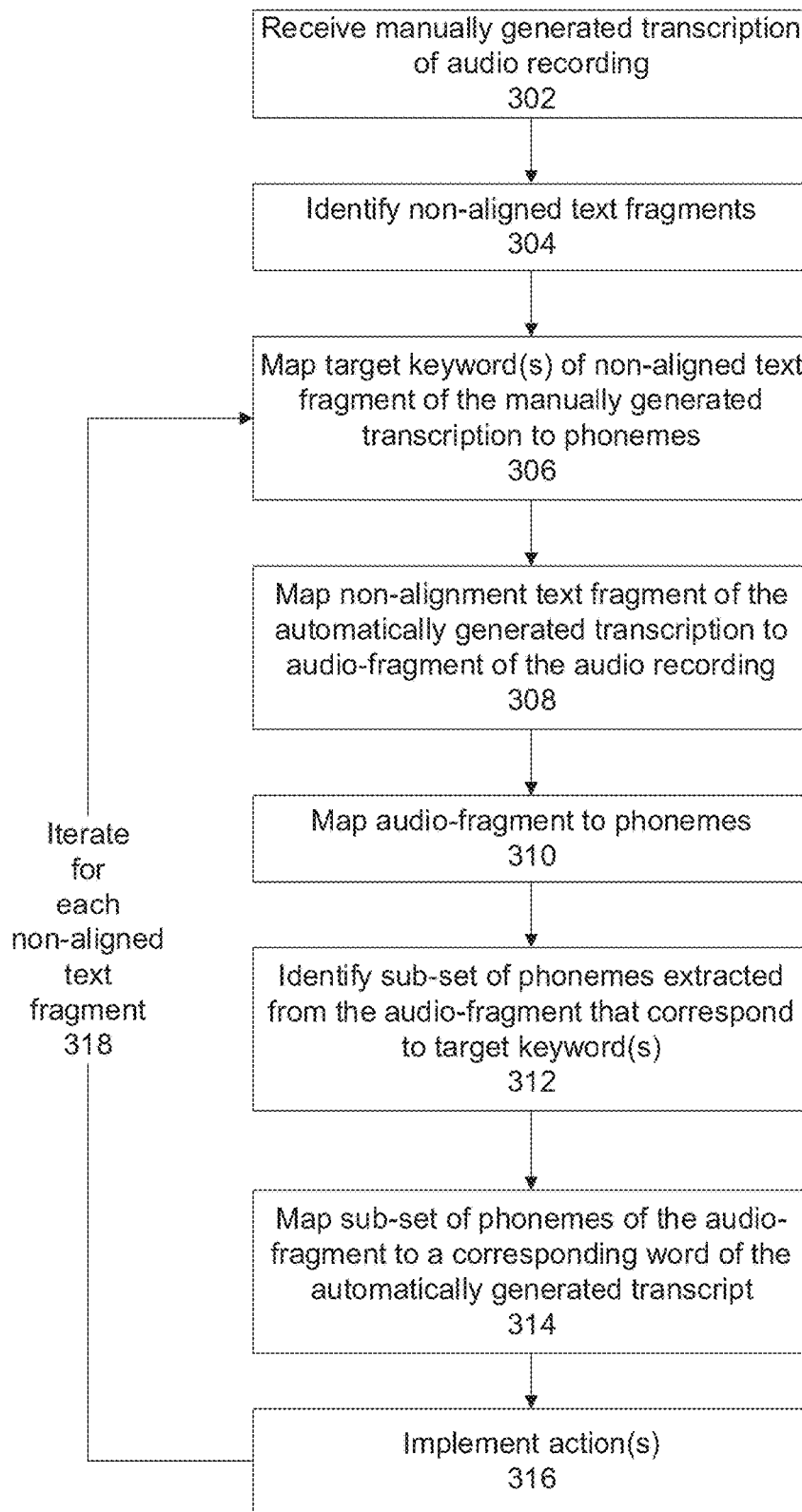
FIG. 3 is a flowchart of a method for aligning the automatically generated transcription of the audio recording to a manually generated transcription of the audio recording, in accordance with some embodiments.
Figure 4:
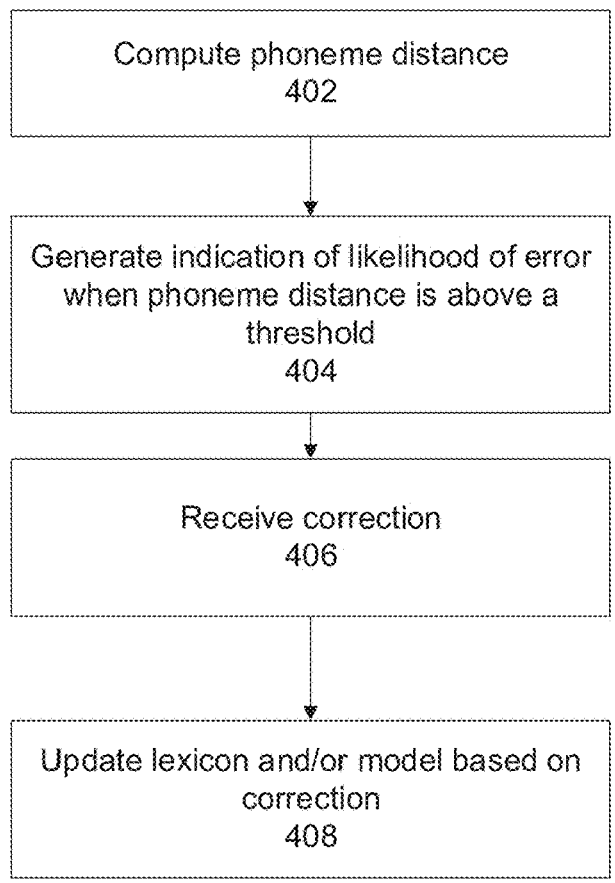
FIG. 4 is a flowchart of a method for evaluating quality of the automatically generated transcription of an audio recording, in accordance with some embodiments.
Figure 5:
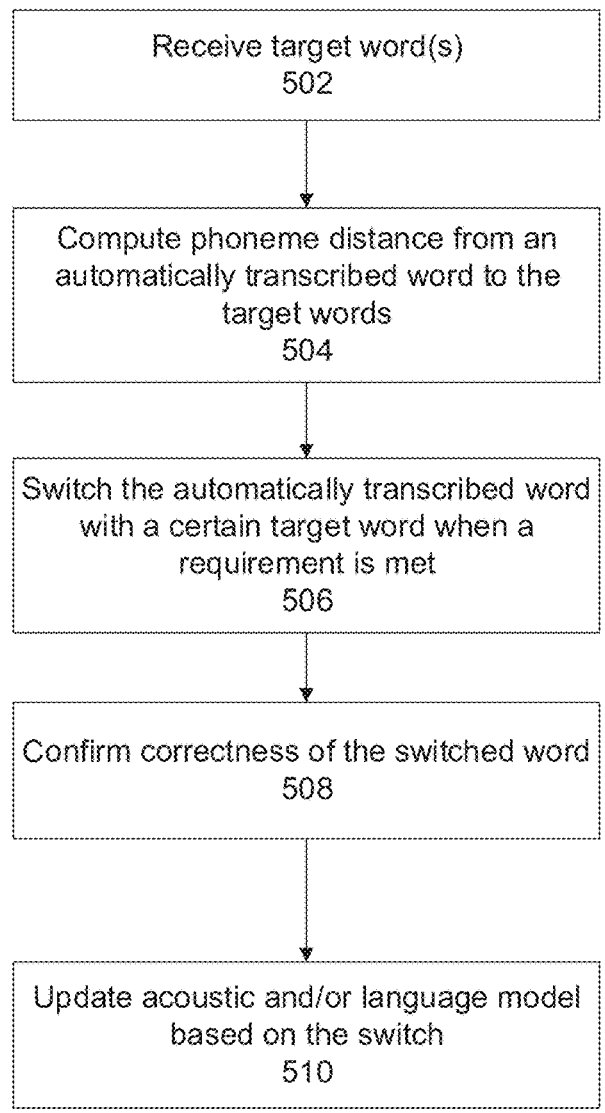
FIG. 5 is a flowchart of a method for post-processing an automatically generated transcription of an audio recording to correct transcription errors, in accordance with some embodiments.

Reference is now made to FIG. 1, which is a block diagram of a system 100 for analyzing an automatically generated transcription of an audio recording, in accordance with some embodiments. Reference is also made to FIG. 2, which is a flowchart of a method for analyzing an automatically generated transcription of an audio recording, in accordance with some embodiments. Reference is also made to FIG. 3, which is a flowchart of a method for aligning the automatically generated transcription of the audio recording to a manually generated transcription of the audio recording, in accordance with some embodiments. Reference is also made to FIG. 4, which is a flowchart of a method for evaluating quality of the automatically generated transcription of an audio recording, in accordance with some embodiments. Reference is also made to FIG. 5, which is a flowchart of a method for post-processing an automatically generated transcription of an audio recording to correct transcription errors, in accordance with some embodiments. System 100 may implement the acts of the method described with reference to FIGS. 2-5, by processor(s) 102 of a computing device 104 executing code instructions 106A and/or 106B stored in a storage device 106 (also referred to as a memory and/or program store).

It is noted that the systems, methods, apparatus, and/or code instructions described herein may be implemented for use with any language. English is used herein as a not necessarily limiting example.

Computing device 104 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

Multiple architectures of system 100 based on computing device 104 may be implemented. In an exemplary implementation, computing device 104 storing code 106A and/or 106B, may be implemented as one or more servers (e.g., network server, web server, a computing cloud, a virtual server) that provides services (e.g., one or more of the acts described with reference to FIGS. 2-5) to one or more client terminals 112 over a network 114, for example, providing software as a service (SaaS) to the client terminal(s) 112, providing software services accessible using a software interface (e.g., application programming interface (API), software development king (SDK)), providing an application for local download to the client terminal(s) 112, and/or providing functions using a remote access session to the client terminals 112, such as through a web browser. For example, users having client terminals 112 installed in their offices (or using mobile devices) use their local client terminal to access computing device 104, which may be remotely located. The users may provide a respective audio and/or manually generated transcription and/or automatically generated transcription recording to computing device 104, which performs one or more services as described with herein with reference to FIGS. 2-5, and provides the output back to the respective client terminal. In another example, computing device 104 may include locally stored software (e.g., code 106A and/or 106B) that performs one or more of the acts described with reference to FIGS. 2-5, for example, as a self-contained client terminal.

Different services may be performed at a single device, and/or by multiple devices (e.g., client terminal(s) 112 and/or server(s) 110), optionally communication with one another over a network 114. Exemplary services include: obtaining the audio recording (optionally stored in audio recording repository 116C), generation of a manually generated transcription of the audio recording (optionally stored in repository 116A), generation of an automatically generated transcription of the audio recording by acoustic and/or language model code 106B (optionally stored in repository 116B), and one or more of the processes described with reference to FIGS. 2-5 performed by code 106A. Code 106A, acoustic and/or language model 106B, the audio recording(s) (e.g., repository 116C), the manually generated transcription (e.g., repository 116A), and/or the automatically generated transcription (e.g., repository 116B) may be stored on a single device and/or multiple devices (e.g., computing device 104, client terminal(s) 112, server(s) 110). For example, one client terminal provides the audio recording, a server computes the automatically generated transcription by acoustic and/or language model 106B, a user working at another client terminal creates the manually generated transcription, and computing device 104 uses code 106A to implement one or more of the processes described with reference to FIGS. 2-5. In another example, client terminal(s) 112 provides the audio recording, with computing device 104 performing the other features.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 2-5 when executed by processor(s) 102. Storage device 106 may store audio model code 206B that automatically generates the transcription from the audio recording, as described herein.

Computing device 104 may include a data repository 116 for storing data, for example, manually generated transcription repository 116A that stores the manually generated transcriptions of the audio recording (e.g., used as a gold standard), automatically generated transcription repository 116B that stores the automatically generated transcriptions of the audio recording when acoustic and/or language model code 106B is executed, and audio recording repository 116C which stores the raw audio recordings (e.g., as analogue and/or digital sound and/or video files), as described herein. Data repository 116 may be implemented as, for example, a memory, a local hard-drive, virtual storage, a removable storage unit, an optical disk, a storage device, and/or as a remote server and/or computing cloud (e.g., accessed using a network connection).

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may connect using network 114 (or another communication channel, such as through a direct link (e.g., cable, wireless) and/or indirect link (e.g., via an intermediary computing unit such as a server, and/or via a storage device) with client terminal(s) 112 and/or server(s) 110.

Computing device 104 and/or client terminal(s) 112 and/or server(s) 110 include and/or are in communication with one or more physical user interfaces 108 that include a mechanism for entering data (e.g., selecting which feature to perform, entering target terms, and/or for designating files) and/or for viewing data (e.g., identified errors in the automated transcription), as described herein. Exemplary user interfaces 108 include, for example, one or more of, a touchscreen, a display, a keyboard, a mouse, and voice activated software using speakers and microphone.

At 202, an audio recording is received. The audio recording stores sounds which are convertible to text based on phonemes and a lexicon indicating which string of phonemes each word consists of. The audio recording may be stored as an audio file, which may be analogue and/or digital, for example, using an MP3 format. The audio recording may be recorded by a microphone, for example, a person dictating notes into the microphone. The audio recording may be extracted from a video that includes a visual component, for example, the sound track of the video. The audio recording may include non-speech sounds, for example, music, noises of vehicles, and noises generated by animals. In such cases, the non-speech portions may be excluded from further analysis.

As used herein, the term audio recording may be interchanged with the term audio dataset.

At 204, an automatically generated transcription of the audio recording is received and/or computed. The automatically generated transcription may be stored, for example, as a text file of human readable words in the corresponding language (e.g., English). For example, a specialist physician calls a number and dictates notes for a report for a certain referred patient. A text file of the automatically generated transcription of the verbal report is prepared, and may be read by the referring family practice physician.

Figure 6:
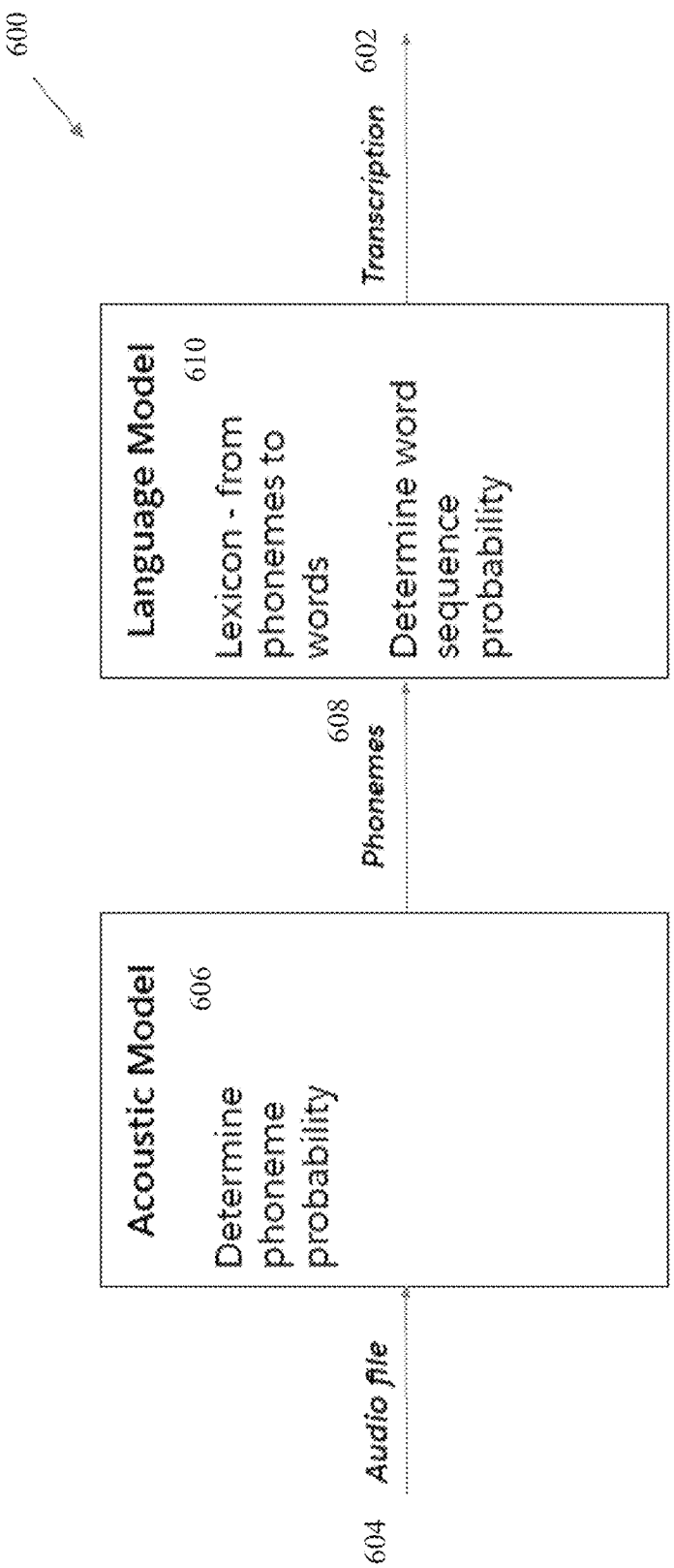
FIG. 6 is a schematic of an exemplary dataflow for creating an automatically generated transcription of an audio recording, in accordance with some embodiments.

Reference is now made to FIG. 6, which is a schematic of an exemplary dataflow 600 for creating an automatically generated transcription 602 of an audio file (i.e., audio recording) 604, in accordance with some embodiments. Dataflow 600 described with reference to FIG. 6 may be implemented, for example, by components of system 100 described with reference to FIG. 1, for example, processor 102 executing acoustic and/or language model code 106B stored on memory 106.

Audio file 604 is fed into an acoustic model 606 that extract phonemes 608 from audio recording 604. Acoustic model 606 may assign a probability value to each extracted phoneme indicative of likelihood of accurate extraction thereof. The extracted phonemes 606 are fed into a language model 610 that maps phonemes 608 to words (e.g., stored in a lexicon dataset) and determines a word sequence probability. Language model 610 outputs the most probable automatically generated transcription 602.

Optionally, each automatically transcribed word is assigned a respective confidence value indicating likelihood of accuracy of correct automatic transcription thereof. The respective confidence value (of the respective word selected from the lexicon) is computed for the most likely matching word within the lexicon. The confidence value for the matching word does not represent accuracy of whether the word in the lexicon is correct or not, but whether the word in the lexicon is the best match or not. Words not in the lexicon are not considered. The automatically transcribed word may be selected for inclusion in the automatically generated transcription when the automatically transcribed word is assigned a confidence value by the language model above a threshold. The threshold may be set, for example, manually by a user and/or automatically by code. The threshold represents a tradeoff, for example, when the threshold is high, only highly accurate words are inserted, resulting in human intervention to address the words with low confidence values. In another example, when the threshold is low, the majority or all of the words may be automatically transcribed, but may include errors.

Figure 7:
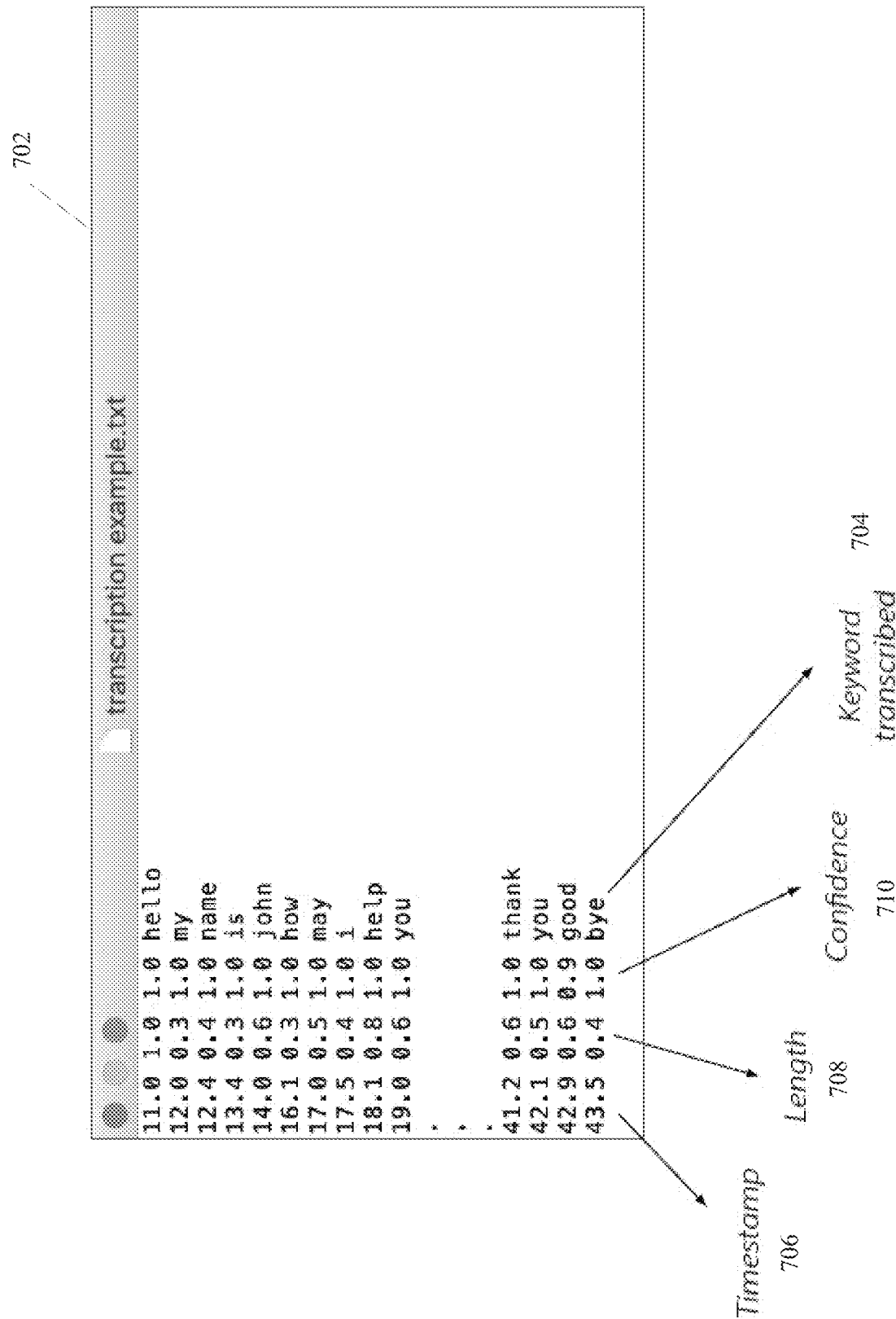
FIG. 7 is a schematic of an exemplary automatically generated transcription, in accordance with some embodiments.

Reference is now made to FIG. 7, which is a schematic of an exemplary automatically generated transcription 702, in accordance with some embodiments. Automatically generated transcription 702 may be stored, for example, as a file, for example, with comma and/or space separated values. Automatically generated transcription 702 includes the automatically transcribed words (sometimes referred to as keyword) 704. Each automatically transcribed word may be associated with one or more values of the following values (e.g., stored on a row, separated by spaces and/or commas, next to the corresponding words): timestamp 706 indicative of time location within the corresponding audio recording, for example, seconds from start of the audio recording; length 708 indicative of amount of seconds that the corresponding spoken word takes up in the audio recording; and confidence 710 (as described above).

Referring now back to FIG. 2, one or more of 206, 208, and 210 may be implemented using the automatically generated transcriptions.

A phenome distance is used in the processes of FIGS. 3-5 corresponding to features 206, 208, and 210. The phenome distance is used to provide a quantification of similarity between a spoken word in the audio recording and the corresponding automatically transcribed word. Different measure definitions may be used for the phoneme distance. In one example, the phoneme distance may be a minimum edit distance between two strings of phonemes, phonemes detected ("heard") in the acoustic model and the phoneme breakdown of the matching word selected from the lexicon, divided by the number of phonemes detected.

The phoneme distance may be a standard phoneme distance (e.g., binary minimum edit distance), indicative of whether the aligned phonemes are the same between the audio file and the selected matching word (e.g., distance defined as 0), or whether the aligned phonemes are different between the audio file and the selected matching word (e.g., distance defined as 1).

In another implementation, the phoneme distance may be a weighted phoneme distance that weights different attributes of the phonemes (e.g., manner and/or place of articular) to create a more detailed difference.

The weighted phoneme distance may compute a non-binary value indicative of an amount of similarity between phonemes extracted from the spoken word (obtained from the audio record) and corresponding phonemes extracted from the matching word selected from the lexicon.

Figure 8:
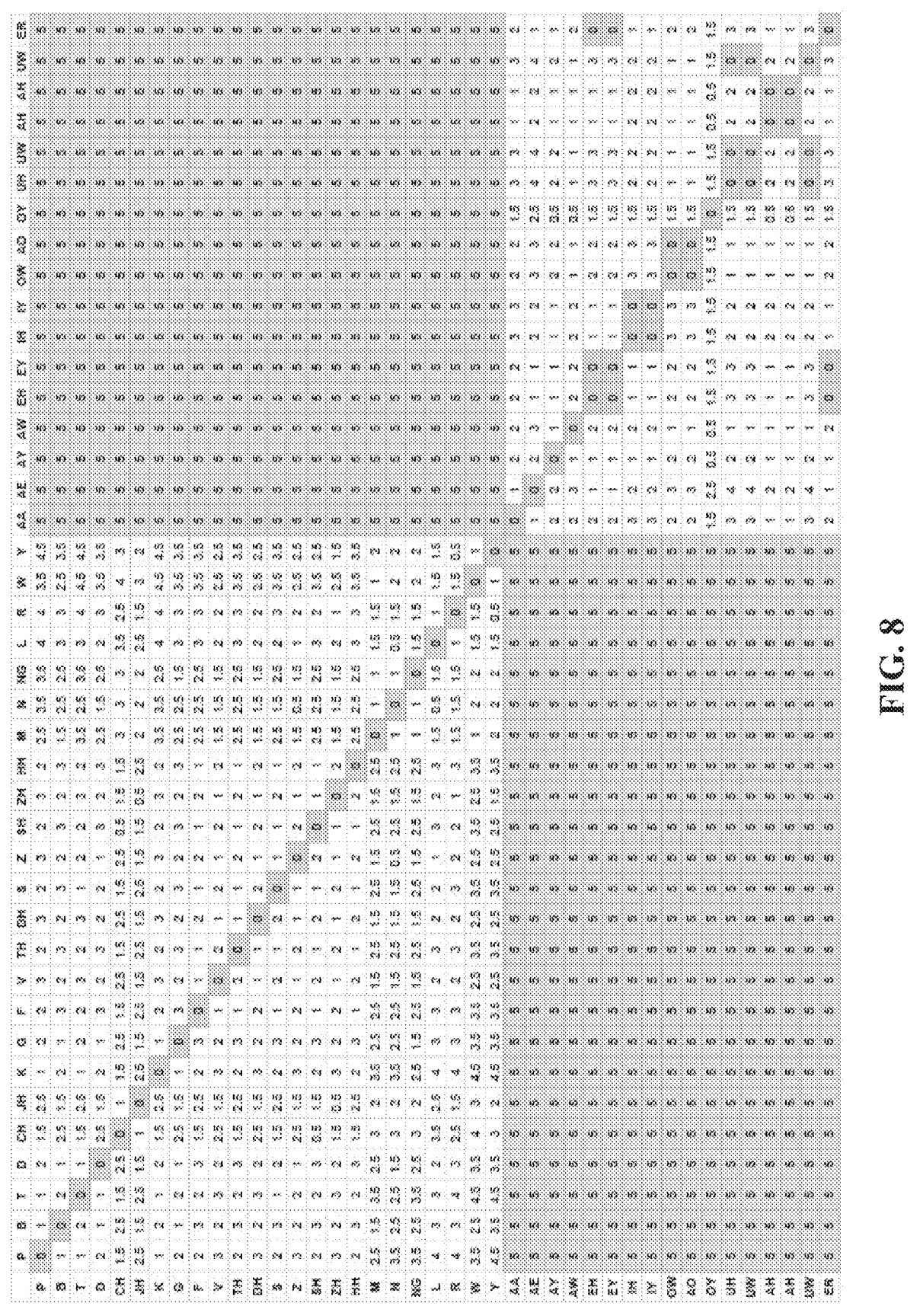

Reference is now made to FIG. 8, which is a schematic of an exemplary table used to compute weighted phoneme distances, in accordance with some embodiments. As shown, phonemes of the spoken word and the corresponding automatically transcribed word that match as are assigned a value of 0. Increasing weights are assigned as the sound difference between the phonemes of the spoken word and the corresponding automatically transcribed word are increased, for example, the difference between the two consonants "P" and "B" is relatively small, having a value of 1, while the difference between the two consonants "P" and "N" is relatively large having a value of 3.5.

As used herein, the term phoneme distance may sometimes refer to the standard phoneme distance, the weighted phoneme distance, and/or to other implementations of the phoneme distance.

At 206, the automatically generated transcription of the audio recording is aligned to a manually generated transcription of the audio recording.

An exemplary method of aligning the automatically generated transcription to the manually generated transcription is described with reference to FIG. 3.

Alternatively or additionally, at 208, quality of the automatically generated transcription of the audio recording is evaluated.

An exemplary method of evaluating quality of the automatically generated transcription of the audio recording is described with reference to FIG. 4.

Alternatively or additionally, at 210, the automatically generated transcription of the audio recording is post-processed to correct transcription errors.

An exemplary method of post-processing the automatically generated transcription of the audio recording is described with reference to FIG. 5.

At 302, a manually generated transcription of the audio recording is received. The manually generated transcription is created manually by data annotators, for example, by a human transcriber that listens to the audio recording and types the text version of the spoken words.

The manually generated transcription represents a gold standard indicative of a perfect transcription, and provides a baseline for comparison.

At 304, multiple non-aligned text fragments are identified. Each non-aligned text fragment is located between respective two non-continuous aligned text-fragments of the automatically generated transcription. Each aligned text-fragment matches multiple words of the manually generated transcription, optionally a sequence of at least 4, 5, 6, or greater number of matching words.

Figure 9:
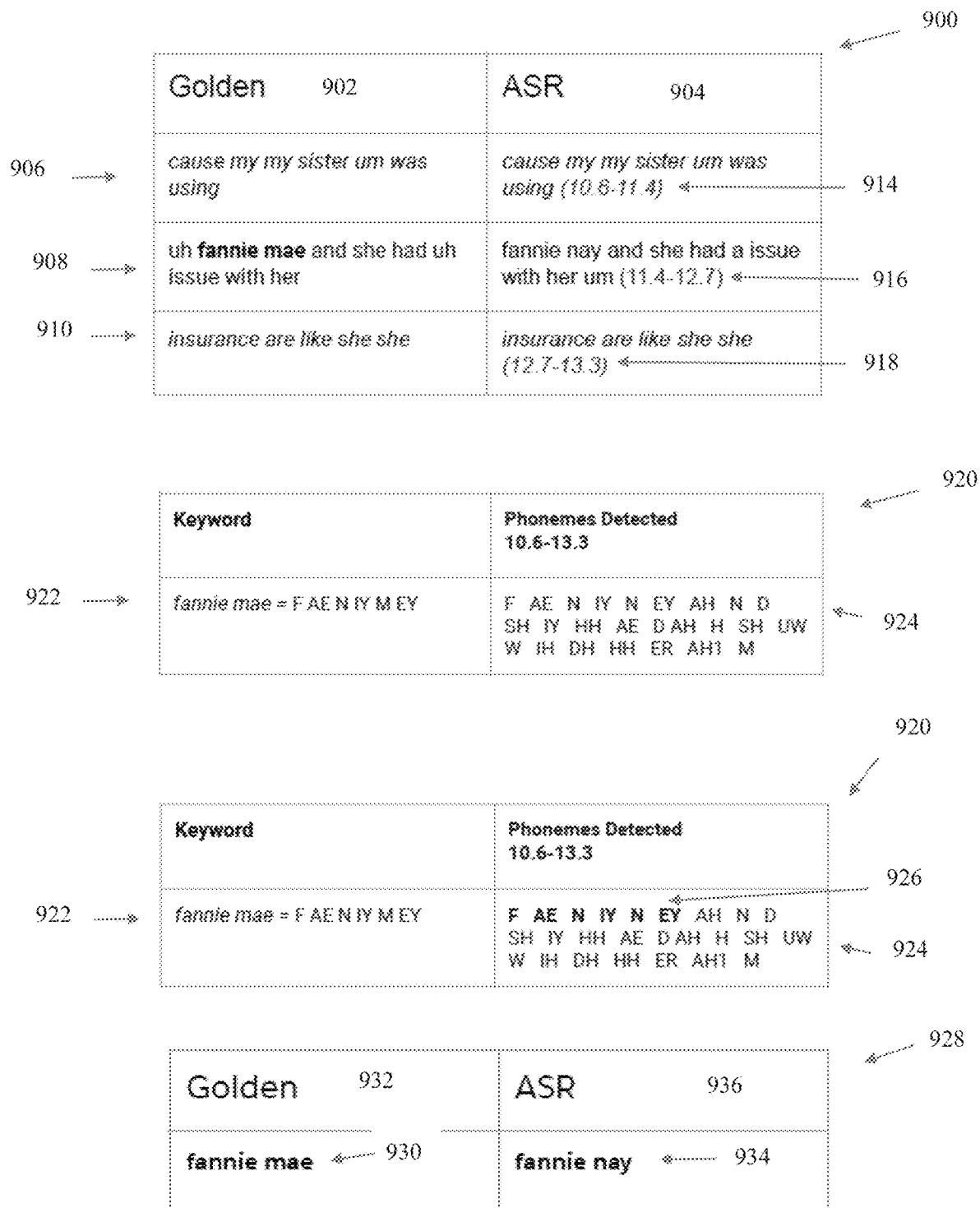
FIG. 9 is a table comparing between text-fragments of a golden transcription of an audio recording and a corresponding automatically generated transcription of the audio recording, in accordance with some embodiments.

Reference is now also made to FIG. 9, which includes a table 900 comparing between text-fragments of a golden transcription (column 902) of an audio recording and a corresponding automatically generated transcription (column 904) of the audio recording, in accordance with some embodiments. Text-fragments in rows 906 and 910, which each include at least 4 matching words, are identified as being aligned. Text-fragments in row 908, which are between text-fragments of rows 906 and 910, are identified as non-aligned.

Referring back to FIG. 3, at 306, at least one target keyword of the identified non-aligned text fragment of the manually generated transcription is mapped to multiple phonemes, for example, by being fed into an acoustic and/or language model, as described herein.

The target keywords may be, for example, every single keyword appearing in the golden transcription (which may be treated as a golden corpus). Using each keyword may be relevant to short transcriptions, and/or transcriptions with a small set of unique words, since using each keyword is computationally expensive. In another example, the target keywords may be words that are identified as being interesting in a domain and/or context of the transcription, for example, names of products, names of companies mentioned in sales calls, keywords identified by a side in a conversation as interesting, keywords known to have a transcription issue, slang terms, short cut words (e.g., nicknames, abbreviations), and special vocabulary words (e.g., words used in a specialized field of expertise, such as medical anatomical words, technological words used in a specific technical field, and scientific words used in a specific scientific field), and/or words found in a certain dialect spoken by a small number of people. The target keywords may be provided, for example, manually entered and/or automatically obtained (e.g., from a database).

Referring back to FIG. 9, the target keywords "fannie mae" of the identified non-aligned text fragment 908 of the manually generated transcription 902 is mapped to multiple phonemes.

Referring back to FIG. 3, at 308, the respective non-aligned text fragment of the automatically generated transcription is mapped to a corresponding audio-fragment of the audio recording.

Words of the automatically generated transcription are associated with a timestamp indicating a mapping to the audio recording. The timestamp may be a time interval denoting the start and end of the audio-fragment of the audio recording corresponding to the respective text fragment. The respective non-aligned text fragment may be mapped to the corresponding audio-fragment according to the timestamp (e.g., time interval).

Referring back to FIG. 9, text fragments within rows 906, 908, and 910 of automatically generated transcript 904 within table 900 are each assigned a corresponding timestamp 914, 916, and 918.

Referring back to FIG. 3, at 310, the audio-fragment (which is mapped to the respective non-aligned text fragment), which includes the target keywords in spoken format, is mapped to multiple phonemes extracted from the audio-fragment. Audio-fragments may be extracted from the audio-fragment, for example, using the acoustic model described herein.

It is noted that the phonemes extracted from the audio-fragment may be extracted from other words, in addition to the target keywords.

Referring back to FIG. 9, table 920 presents the identified keywords "fannie mae" 922 in the identified non-aligned text fragment and corresponding phonemes 924 extracted from the corresponding audio-fragment having times 10.6-13.3 in the audio recording. Phonemes 924 are extracted from the audio-fragment of row 908 of table 900, which includes the keywords "fannie mae" in addition to other words, i.e., phonemes are extracted from the phrase of the audio-fragment "uh fannie mae and she had uh issue with her".

Referring back to FIG. 3, at 312, a sub-set of the phonemes extracted from the audio-fragment that correspond to the phonemes of the target keyword extracted from the manually generated transcription are identified.

Optionally, the sub-set phonemes of the audio-fragment are identified as corresponding to the phonemes of the target keyword according to a closest match value. The closest match value may be computed based on phoneme distance, optionally phoneme weighted distance. The sub-set of phonemes having a phoneme (weighted) distance representing a closest matching value are identified. For example, the phonemes having lowest phoneme weighted distance, and/or having the phoneme weighted distance below a threshold are selected.

Optionally, the matching between phonemes of the keywords and phonemes extracted from the audio-fragment is according a lowest value of a phoneme distance to the phonemes of the keyword of the manually generated transcript (i.e., since the corresponding text fragment automatically generated transcript does not align with the manually generated transcript, it may be assumed that the non-aligned text fragment contains errors, and since the manually generated transcript is considered as being correct as discussed herein).

Exemplary phoneme distances include: a binary phoneme distance that assigns a binary value indicative of whether each respective phenome is matched or is not matched, and a weighted phoneme distance that assigns a non-binary value indicative of an amount of similarity between corresponding phonemes. Additional details of exemplary phoneme distances are described herein.

Referring back to FIG. 9, phonemes 926 "F AE N IY N EY" (in bold) extracted from the audio-fragment are matched to the keywords 922 "fannie mae" of the manually generated transcript 922.

Referring back to FIG. 3, at 314, the identified sub-set of the phonemes of the audio-fragment are mapped to a corresponding word of the automatically generated transcript. The mapping is done within the corresponding timestamp (i.e., time interval), which simplifies the computational mapping task, for example, in comparison to searching throughout the transcription using different metrics computed for each term. The manually generated transcription doesn't have timestamps but the automatically generated transcription does have corresponding timestamps. When the closest match is found to the string of phonemes that make up the word in the manually generated transcription that are searched for in the automatically generated transcription output, the phonemes have timestamps as part of the output of the acoustic model. Words also have timestamps in the automatically generated transcription output, which allows to check the phonemes and their timestamps and determine which word or words appear in the corresponding timestamps in the automatically generated transcription output, which provides the mapping of the word(s) the manually generated transcription to word(s) in the automatically generated transcription.

The corresponding word is an incorrect automated transcription of the target word appearing in the manually generated transcription.

Referring back to FIG. 9, table 928 summarizes that the keywords "fannie mae" 930 found in the manually generated transcript 932 are mapped to the keywords "fannie nay" 934 found in the automatically generated transcript 936.

Referring back to FIG. 3, at 316, one or more action are implemented, optionally automatically, based on the identified alignments, for example, finding mistranscriptions, calculating precision and/or recall per automatically translated word, and/or providing feedback to a machine learning and/or artificial intelligence model, and/or automatically correcting the acoustic and/or language model.

Optionally, the identified keyword(s) found in the manually generated transcript that are mapped to corresponding keywords(s) found in the automatically generated transcript, in the misaligned portion, are analyzed. The analysis may be performed automatically (e.g., by machine learning code, a set of rules, and/or other implementations) and/or manually by a user (e.g., presenting the identified keywords to a user in a graphical user interface). For example, when a keyword is identified as being mistranscribed by the model, a decision is made. The mistranscription may be corrected, and/or an analysis is performed to determine the cause of the mistranscription. For example, is the phoneme breakdown wrong, in which case the process (e.g., grapheme-to-phoneme (G2P), which is a process that converts words into phonemes. The G2P process takes any word as input and outputs the possible phoneme breakdowns (i.e., pronunciations)) that computed the phoneme breakdown may be corrected fix it. In another example, the language model may not be familiar with the keyword in the context used, in which case the language model may be retrained with sentences including the keyword within the correct context. In yet another example, the keyword may be a very common mistranscription that there is nothing necessarily to do about, in which case post-processing may be used to automatically replace the mistranscription for the correct keyword.

Optionally, the target keyword(s) of the manually generated transcription and the corresponding word(s) of the automatically generated transcription are provided for automatically updating a model that computes the automatically generated transcript.

Alternatively or additionally, the target keyword of the manually generated transcription and the corresponding word of the automatically generated transcription are used for adjusting the model for correctly automatically transcribing an audio-fragment (corresponding to the audio-fragment of the audio recording to the target keyword of the manually generated transcription), instead of to the corresponding word of the automatically generated transcript.

Solutions as described herein may be implemented based on the identified problem. For example, when the phoneme breakdown is wrong, the process may be corrected. In another example, when the language model isn't familiar with the keyword in the context, the language model may be corrected. In yet another example, when the word isn't in the lexicon the word and its phoneme breakdown may be added to the lexicon. In yet another example, when the word is a mistranscription that cannot be solved by correction of the language model, the word may be substituted in a post-process. The audio fragment and the accurate manually generated transcription may be added back into the training set for retraining the model with the new keyword.

Alternatively or additionally, a value for precision and/or recall of transcription of the target keyword of the manually generated transcription in the automatically generated transcript is computed.

At 318, one or more of features 306-316 are iterated for each respective non-aligned text fragment.

At 402, for each respective word selected from the lexicon (e.g., selected by the language model), a phoneme distance is computed. The phoneme distance is computed between phonemes extracted from a portion of the acoustic recording corresponding to the respective selected word and phonemes of the respective selected word, as described herein.

At 404, an indication of likelihood of an error of the respective selected word is generated when the computed phoneme distance is under a threshold. The threshold may be set, for example, manually by a user and/or automatically by code.

A standard non-phoneme-distance post process that uses existing known methods usually considers one phoneme over a keyword as close enough (i.e., if a word consists of a few phonemes, and the word selected is only one phoneme different from the word being searched for, the switch is made). In contrast, phoneme distance as described herein enables calibration, for example, when one phoneme is different between two words and the phoneme distance between the two words is 5, which is less good than two phoneme changes with a phoneme distance of 2 for each phoneme change. The threshold may be set to obtain the best results per keyword, for example, based on experiments and/or trial and error, manually and/or automatically performed. The threshold may be a fixed constant value, and/or defined as a function with variables, for example, a function of the length of the keyword and how many phonemes are in the keyword. When the threshold is set too high/low there is a risk of switching words that aren't the keyword that was mistranscribed or not finding anything close enough in the search to switch.

The error is indicative that no correct word corresponding to the phonemes extracted from the portion of the acoustic recording exists in the lexicon, and/or that there is an error in the automated transcription of the phonemes extracted from the portion of the acoustic recording.

For example, for the word "Salesforce" extracted from the audio file, the corresponding phonemes are computed, as described herein. The acoustic and/or language model selects the closest word in the lexicon to the spoken word. When the word "Salesforce" is not in the lexicon, the closest selected word may be "sleepwalk". Since "sleepwalk" is the only word in the lexicon that is closest to the word extracted from the audio file, the word confidence may be high, for example, 1 or very close to 1, indicating a perfect or very high match. However, since "sleepwalk" sounds very different that "Salesforce" and as a result the phonemes of "sleepwalk" are different than the phonemes of "Salesforce", the computed phoneme distance is higher than the threshold, triggering the generation of the indication of error. In this case, that the spoken word is not in the lexicon at all.

Figure 10:
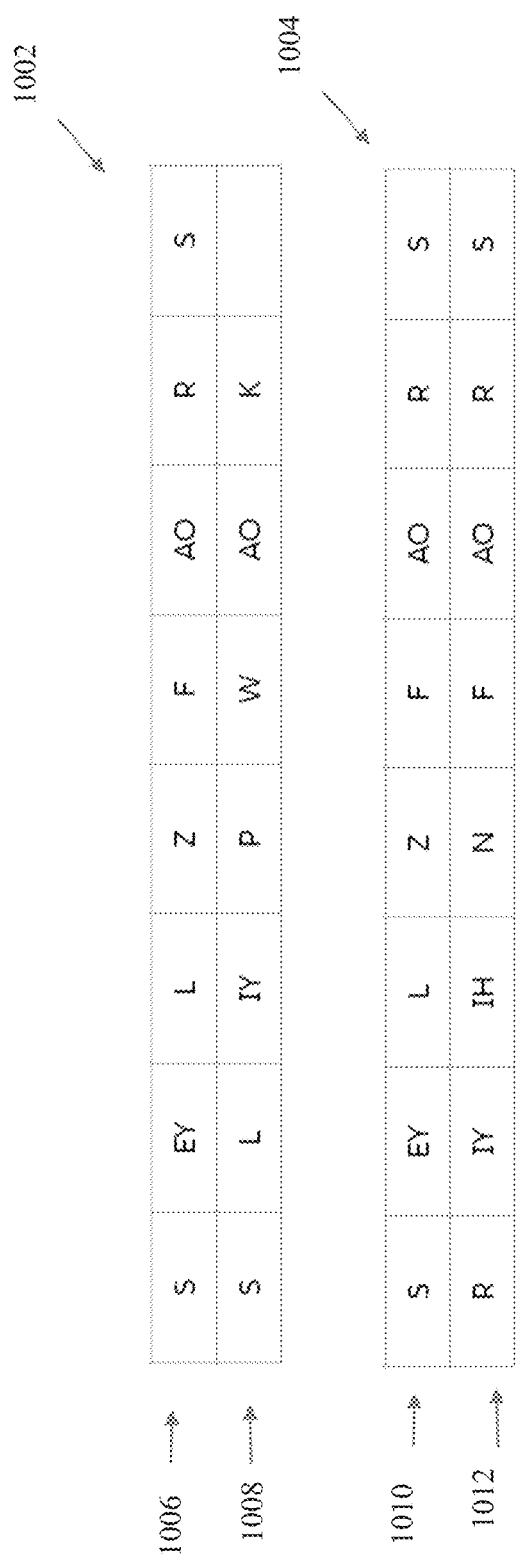
FIG. 10 includes tables of phonemes to help understand how the phoneme distance is used to evaluate quality of the automatically generated transcription, in accordance with some embodiments.

Reference is now made to FIG. 10, which includes tables of phonemes 1002 and 1004 to help understand how the phoneme distance is used to evaluate quality of the automatically generated transcription, in accordance with some embodiments.

In table 1002, cells of row 1006 store phonemes of the word "Salesforce", and cells of row 1008 store phonemes of the word "sleepwalk", using the same G2P. The minimum edit distance is computed to be 6, and the phoneme distance is computed to be 0.75.

Table 1004 provides another example. Cells of row 1010 store phonemes of the word "Salesforce", and cells of row 1012 store phonemes of the word "reinforce", using the same G2P. The minimum edit distance is computed to be 4, and the phoneme distance is computed to be 0.5.

The phoneme distance for "reinforce" relative to "Salesforce" is smaller than the phoneme distance for "sleepwalk" relative to "Salesforce", indicating that "reinforce" is a better automatic translation and closer fit. Using the phoneme distance, a numeric value is computed that indicates how close two strings of phonemes are, that when compared with the threshold provides an indication of how good the fit is between the automatically transcribed word and the detected spoken word.

By setting the threshold appropriately, the automatic translation of the spoken word "Salesforce" into "sleepwalk" or "reinforce" which are in the lexicon, may be identified as being incorrect. For example, indicating that the automatically translated word corresponding to the spoken word "Salesforce" is not in the lexicon, and/or that the automatic transcription of the spoken word is very inaccurate. It is noted that sleepwalk is still a mistranscription, but a mistranscription that is be difficult to fix with post-process, because the mistranscription is so far from the actual keyword, that if replaced, it would be replacing a lot of other words, increasing risk of false switches and/or creating false positives. Since the word "reinforce" is closer, the word "reinforce" is easier to catch with a good post-process (as described herein), which reduces the risk of false switches and/or creating false positives.

Referring now back to FIG. 4, at 406, a correction of the respective selected word that triggered the generate error may be received, for example, manually from a user via a graphical user interface (GUI). For example, the GUI may present an indication of the generated error, and/or present related data useful to the user to help determine what the correction should be. The user may manually enter the correction, for example, typing the word and/or selecting from a list of automatically generated candidate words.

At 408, the lexicon and/or the language model and/or acoustic model may be updated with the correction.

At 502, one or more target words are received.

The target words may be words that are not commonly found in a dictionary and/or in a general purpose lexicon, for example, as described above.

Optionally, the target words are excluded from the lexicon used by the language model to create the automatically generated transcription.

The target words may be provided, for example, manually entered by a user (e.g., typed into a GUI), and/or stored in a secondary dataset.

At 504, a respective weighted phoneme distance is computed from a respective automatically transcribed word to each of the target words.

It is noted that a subset of the target words which are closest to the automatically transcribed word may be identified using other approaches, and the weighted phoneme distance is computed relative to the identified subset of target words.

At 506, when the respective phoneme distance is according to a requirement (e.g., threshold, range), the respective automatically transcribed word is switched to a certain target word. The certain target word may correspond to a lowest value of the respective phoneme distance.

The requirement may be selected according to a consideration of what is close enough to be a good fit between the certain target word and the automatically generated transcription, that indicates that the certain target word is to be switched with the automatically generated transcription.

The requirement may be set, for example, manually by a user and/or automatically based on code. The requirement may be set to meet a target tradeoff, for example, to avoid lowering precision. Setting the requirement too high may only select target words that are very similar to the automatically transcribed words, which may exclude cases where the target words are more dissimilar. Alternatively, when the requirement is too low, the switch may be performed for dissimilar words which are incorrect.

Optionally, the requirement is selected to be indicative of the automatically transcribed word being similar to, but not identical to the target words. The requirement may be a range having an upper threshold value of the phoneme distance denoting identical words, and a lower threshold value of the phoneme distance denoting similar but different words. The switch may be performed when the computed phoneme distance falls within the range.

At 508, the correctness of the switch may be confirmed, when a phoneme distance computed between phonemes extracted from a portion of the audio recording corresponding to the automatically transcribed word, and the certain target word (i.e., the switched word) denotes statistical equivalence. For example, the phoneme distance is 1, or close to 1, or above a threshold indicating statistical equivalence.

At 510, the respective automatically transcribed word and an indication of a switch to the certain target word are used to update the acoustic and/or language model for improved accuracy in mapping phonemes to the certain target word.

In an example, the keyword "Salesforce" is provided. The automatically generated transcription for the spoken word "Salesforce" is determined to be "reinforce". The phoneme distance between "Salesforce" and "reinforce" is computed. The phoneme distance meets the requirement. The automatically transcribed word "reinforce" is switched with the identified target word "Salesforce" The correctness of the switch is confirmed. The acoustic and/or language model is updated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant acoustic and/or language models will be developed and the scope of the term acoustic and/or language model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A computer implemented method of aligning an automatically generated transcription of an audio recording to a manually generated transcription of the audio recording comprising:
   identifying a plurality of non-aligned text fragments, each located between respective two non-continuous aligned text-fragments of the automatically generated transcription, each aligned text-fragment matching a plurality of words of the manually generated transcription;
   for each respective non-aligned text fragment:
      selecting a target keyword of the non-aligned text fragment of the manually generated transcription, wherein the target keyword is not in a lexicon used for creation of the automatically generated transcription;
      breaking down the target keyword of the manually generated transcription to a plurality of phonemes;
      mapping the respective non-aligned text fragment that includes the target keyword and at least one non-target keyword to a corresponding audio-fragment of the audio recording;
      breaking down the audio-fragment to a plurality of phonemes;
      identifying at least some of the plurality of phonemes of the audio-fragment that map to the plurality of phonemes of the target keyword; and
      mapping the identified at least some of the plurality of phonemes of the audio-fragment to a corresponding word of the automatically generated transcript, wherein the corresponding word is an incorrect automated transcription of the target word appearing in the manually generated transcription.

2. The method of claim 1, wherein the at least some of the plurality of phonemes of the audio-fragment are identified as corresponding to the plurality of phonemes of the target keyword according to a closest matched computed based on shortest phoneme weighted distance.

3. The method of claim 1, wherein words of the automatically generated transcription are associated with a timestamp indicating a mapping to the audio recording, and wherein the respective non-aligned text fragment is mapped to the corresponding audio-fragment according to the timestamp.

4. The method of claim 1, wherein the matching comprises selecting the at least some of the plurality of phonemes of the audio-fragment, according a lowest value of a phoneme distance to the plurality of phonemes of the keyword of the manually generated transcript.

5. The method of claim 4, wherein the phoneme distance is selected from the group consisting of: a binary phoneme distance that assigns a binary value indicative of whether each respective phenome is matched or is not matched, and a weighted phoneme distance that assigns a non-binary value indicative of an amount of similarity between corresponding phonemes.

6. The method of claim 1, further comprising feeding the target keyword of the manually generated transcription and the corresponding word of the automatically generated transcription for automatically updating a model that computes the automatically generated transcript.

7. The method of claim 1, wherein the target keyword of the manually generated transcription and the corresponding word of the automatically generated transcription are used for adjusting the model for correctly automatically transcribing an audio-fragment corresponding to the audio-fragment of the audio recording to the target keyword of the manually generated transcription instead of to the corresponding word of the automatically generated transcript.

8. The method of claim 1, further comprising computing a value for precision and/or recall of transcription of the target keyword of the manually generated transcription in the automatically generated transcript.

9. The method of claim 1, wherein the automatically generated transcription is created by an acoustic model that extracts phonemes from the audio recording and assigns a probability value to each phoneme denoting likelihood of accurate extraction, and a language model that receives the extracted phonemes and outputs the automatically generated transcription by mapping phonemes to words and determines a word sequence probability.

10. The method of claim 1, wherein each of the plurality of aligned text-fragments includes a sequence of at least 4 matching words.

11. A computer implemented method of post-processing an automatically generated transcription of an audio recording to correct transcription errors, comprising:
   receiving an audio recording;
   computing the automatically generated transcription of the audio recording by an acoustic model that extracts phonemes from the audio recording, and a language model that receives the extracted phonemes and outputs the automatically generated transcription by mapping phonemes to words selected from a lexicon;
   receiving a plurality of target words, wherein the plurality of target words are excluded from the lexicon;
   computing a respective weighted phoneme distance that assigns a non-binary value indicative of an amount of similarity between corresponding phonemes, from an automatically transcribed word of the automatically generated transcription to each of the plurality of target words, and
   when the respective phoneme distance is according to a requirement, switching the respective automatically transcribed word to a certain target word of the plurality of target words corresponding to a lowest value of the respective phoneme distance.

12. The method of claim 11, wherein the requirement denotes that the automatically transcribed word is similar to but not identical to the plurality of target words.

13. The method of claim 12, wherein the requirement is a range having an upper threshold value of the phoneme distance denoting identical words and a lower threshold value of the phoneme distance denoting similar but difference words.

14. The method of claim 11, wherein the respective automatically transcribed word and an indication of a switch to the certain target word are used to update the language model for improved accuracy in mapping phonemes to the certain target word.

15. The method of claim 11, wherein the automatically transcribed word is selected for inclusion in the automatically generated transcription when the automatically transcribed word is assigned a confidence value by the language model above a threshold.

16. The method of claim 11, further comprising confirming the switching when a phoneme distance computed between phonemes extracted from a portion of the audio recording corresponding to the automatically transcribed word and the certain target word denotes statistical equivalence.

* * * * *